United States Patent [19]

Shanley, II

[11] Patent Number: 4,554,588

[45] Date of Patent: Nov. 19, 1985

[54] CONTROL SYSTEM FOR LUMINANCE/CHROMINANCE SIGNAL PROCESSING CIRCUITS

[75] Inventor: Robert L. Shanley, II, Indianapolis, Ind.

[73] Assignee: RCA Corporation, Princeton, N.J.

[21] Appl. No.: 561,176

[22] Filed: Dec. 14, 1983

[51] Int. Cl.$^4$ .................. H04N 5/68; H04N 9/16; H04N 9/20; H04N 3/24
[52] U.S. Cl. .................. 358/243; 358/74; 358/65; 358/33
[58] Field of Search ............. 358/243, 74, 65, 33, 358/34, 242, 27

[56] References Cited

U.S. PATENT DOCUMENTS

| | | | |
|---|---|---|---|
| 4,263,622 | 4/1981 | Hinn | 358/242 |
| 4,404,593 | 9/1983 | Shanley et al. | 358/168 |
| 4,484,228 | 11/1984 | Parker | 358/243 |

Primary Examiner—Michael A. Masinick
Assistant Examiner—Michael P. Dunnam
Attorney, Agent, or Firm—E. M. Whitacre; P. J. Rasmussen; W. H. Meagher

[57] ABSTRACT

A color television receiver includes AKB control circuits, operative during periodically recurring kinescope bias control intervals, for automatically adjusting the cathode biases of the receiver's color kinescope. To ensure the integrity of the bias adjustment operations undertaken by the AKB control circuits, the receiver is provided with a control system which includes: (1) keyed luminance/chrominance gain control apparatus, serving to effectively disable luminance and chrominance signal amplifiers during each kinescope bias control interval; (2) keyed brightness control apparatus for rendering the DC levels of color signal inputs to the receiver's kinescope drivers independent of the receiver's brightness control adjustment throughout each kinescope bias control interval; and (3) a control loop for controlling the DC level of the receiver's luminance channel output, which opposes departures of one of said color signal inputs from equality with a reference voltage throughout each kinescope bias control interval. A retrace blanking circuit, otherwise supplying beam cutoff biases to the kinescope cathodes during periods of beam retrace, is precluded from such cut-off bias application during beam retrace periods falling within the kinescope bias control intervals.

7 Claims, 4 Drawing Figures

CONTROL SYSTEM FOR LUMINANCE/CHROMINANCE SIGNAL PROCESSING CIRCUITS

The present invention relates generally to control systems for the luminance/chrominance signal processing circuits of a color television receiver, and particularly to control systems suitable for use in receivers of the type incorporating automatic control of color kinescope biasing.

An illustrative arrangement for automatic control of color kinescope biasing in a color television receiver is that described in U.S. Pat. No. 4,263,622—Hinn. In the Hinn arrangement, a control period, occupying a period of several successive line intervals within each vertical blanking interval, is set aside for monitoring a black level current produced by an electron gun under reference signal conditions, for detection of departures from a desired current level, and for readjustment of gun bias to oppose the undesired departures. During a portion of the control period, the color kinescope grid receives a conduction-enhancing pulse; bias control is based upon information derived as indicative of the change in cathode current level introduced by the grid pulsing. An advantageous system for utilization of the above-described Hinn approach in maintenance of an appropriate bias relationship among the color kinescope's gun trio (in the face of aging and other parameter variations) is described in the copending U.S. patent application, Ser. No. 434,314 of R. P. Parker (now U.S. Pat. No. 4,484,228).

For successful use of automatic kinescope bias (AKB) control in the manner exemplified by the structures of the aforementioned Hinn patent and Parker patent application, it is recognized herein that the luminance/chrominance signal processing circuits which process signal information for delivery to the color kinescope during the time periods intervening the periodically recurring bias control periods, require some suitable form of manipulation during the bias control periods to avoid undesirable disturbance or contamination of the current monitoring and bias adjustment functions. In accordance with the principles of the present invention, a control system is provided for the luminance/chrominance signal processing circuits of a color television receiver which, through use of relatively simply implemented keying techniques, modifies conventional functions of such circuits during the recurring bias control periods in a manner ensuring the integrity of the AKB control operations.

In an illustrative embodiment of the present invention, protection of the integrity of the AKB control operations is afforded by keying actions which suitably alter the operation of luminance/chrominance gain control apparatus, brightness control apparatus, and a control loop serving to control the DC level of the receiver's luminance channel output. The keying of the gain control apparatus is such that gains of respective luminance and chrominance signal amplifiers are rendered responsive to an adjustable gain control voltage during all field interval portions with the exception of the kinescope bias control intervals; during the bias control intervals the respective amplifiers are effectively disabled. The keying of the brightness control apparatus renders the DC level of each color signal supplied to the color kinescope responsive to an adjustable brightness control voltage during the presence of image-representative signal components, but independent of the adjustable brightness control voltage throughout the kinescope bias control intervals. The control loop for controlling the DC level of the receiver's luminance channel output includes a keyed comparator, serving to compare the voltage attained by one of the color signals with a reference voltage throughout each kinescope bias control interval, and means for applying the comparator output to the luminance channel to oppose departures of said attained color signal voltage from substantial equality with the reference voltage.

Where the color TV receiver includes a retrace blanking circuit for normally supplying a beam cut-off bias to the color kinescope during periods of beam retrace in the tracing of a display raster, the control system desirably includes additional keying control for precluding such cut-off bias application during beam retrace periods falling within the kinescope bias control intervals. Additionally, where the color TV receiver includes an on-screen display (OSD) system for supplying auxiliary color signals to the color kinescope (e.g., for channel number display, time display, etc.), the control system desirably includes additional keying control for disabling the auxiliary color signal supplying means during the kinescope bias control intervals.

In the accompanying drawings.

Figure 1:
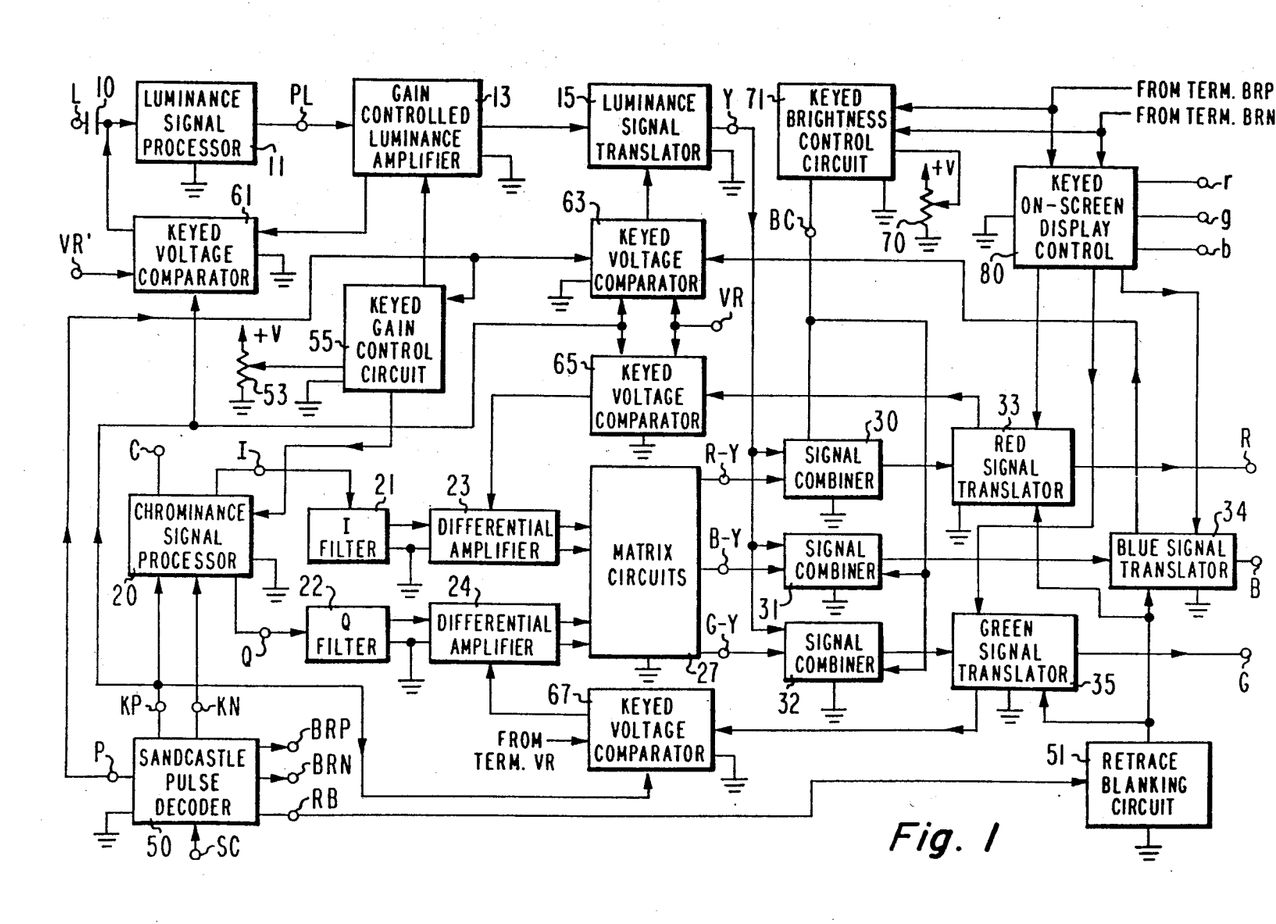
FIGS. 1 and 1a illustrate, partially schematically and partially by block representation, cooperating portions of a color television receiver incorporating a control system in accordance with an embodiment of the present invention.

In FIG. 1, luminance signals appearing at terminal L are applied via a capacitor 10 to the input of a luminance signal processor 11. Illustratively, the luminance signals appearing at terminal L may comprise the luminance signal output of comb filter apparatus (of the type shown in U.S. Pat. No. 4,096,516—Pritchard, for example), employed in a color television receiver to separate the luminance and chrominance components of a received composite signal. Processed luminance signals appearing at an output terminal PL of the processor 11 are supplied to the signal input terminal of a gain controlled luminance amplifier 13. The gain controlled luminance signal output of amplifier 13 is applied to a luminance signal translator, which supplies a luminance signal input to each of a trio of signal combiners 30, 31 and 32.

Chrominance signals appearing at terminal C are applied to the input of a chrominance signal processor 20. Illustratively, the chrominance signals appearing at terminal C may comprise the chrominance signal output of the receiver's comb filter apparatus referred to above. The chrominance signal processor 20 illustratively includes a gain controlled chrominance signal amplifier, a color synchronizing burst separator, a burst synchronized color reference oscillator, and synchronous detectors responsive to outputs of the color reference oscillator for recovering a pair of color-difference signals from the output of the gain controlled chrominance signal amplifier. Keying pulses for control of the burst separating function are supplied to processor 20 from output terminals KP and KN of a sandcastle pulse decoder 50 (to be subsequently explained). Illustratively, the color-difference signal outputs of processor 20 comprise I color-difference signals appearing at terminal I, and Q color-difference signals appearing at terminal Q.

The respective color-difference signal outputs of processor 20 are subject to suitable filtering in respective filters (I filter 21, and Q filter 22) and thereafter applied as signal inputs to respective differential amplifiers 23,24. Matrix circuits 27, illustratively of the general form disclosed in U.S. Pat. No. 4,272,778—Harwood, et al., receive as inputs push-pull versions of the I color-difference signal from differential amplifier 23 and push-pull versions of the Q color-difference signal from differential amplifier 24, and provide appropriate combinations of input signals to develop a trio of different color-difference signal outputs. An R−Y color-difference signal, appearing at matrix output terminal R−Y, is supplied to signal combiner 30 for combination with a luminance signal output of translator 15 to form a red color signal. A B−Y color-difference signal, appearing at matrix output terminal B−Y, is supplied to signal combiner 31 for combination with a luminance signal output of translator 15 to form a blue color signal. A G−Y color-difference signal, appearing at matrix output terminal G−Y, is supplied to signal combiner 32 for combination with a luminance signal output of translator 15 to form a green color signal.

The red color signal output of signal combiner 30 is processed by red signal translator 33 for delivery to the red signal output terminal R. Similarly, the blue color signal output of signal combiner 31 is processed by blue signal translator 34 for delivery to the blue signal output terminal B, and the green color signal output of signal combiner 32 is processed by green signal translator 35 for delivery to the green signal output terminal G.

Figure 1A:
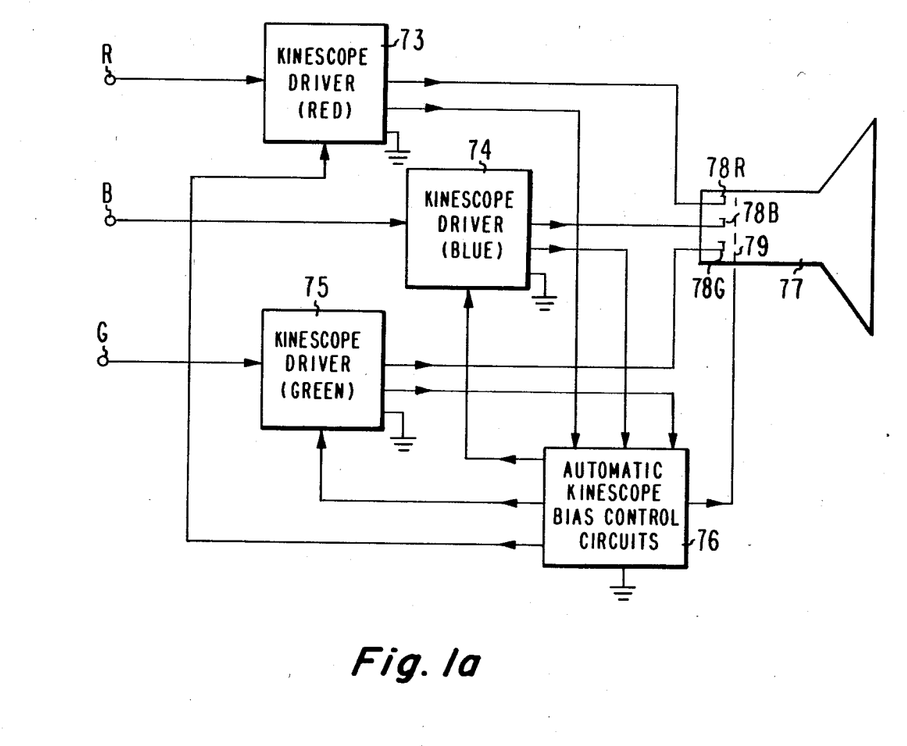

Before consideration of the various control system elements of the FIG. 1 arrangement which are associated with the above-described signal processing circuits, attention is directed to the FIG. 1a showing of circuitry for utilizing the respective color signal outputs developed at terminals R,B and G. As shown in FIG. 1a, a trio of kinescope drivers 73,74,75 are provided, responsive respectively to the red color signal appearing at terminal R, the blue color signal appearing at terminal B, and the green color signal appearing at terminal G.

Display of color images in response to the trio of color signals is effected on the viewing screen of a color kinescope 77, incorporating an electron gun assembly comprising individually energized cathode electrodes 78R,78B and 78G and a commonly energized control grid structure 79. The red content of the displayed color image is determined by control of the intensity of an electron beam emanating from cathode 78R, which is driven by an output of kinescope driver 73. The blue content of the displayed color image is determined by control of the intensity of an electron beam emanating from cathode 78B, which is driven by an output of kinescope driver 74. The green content of the displayed color image is determined by control of the intensity of an electron beam emanating from cathode 78G, which is driven by an output of kinescope driver 75.

The FIG. 1a apparatus also includes automatic kinescope bias control circuits 76, which desirably operate in the manner described in the aforementioned Parker patent application. Thus, the bias control circuits 76 include means for supplying a beam conduction-enhancing pulse to the kinescope control grid 79 during a predetermined portion of the bias control interval (which interval, illustratively, occupies a seven line period during a post-sync portion of each vertical blanking interval of the received signal). The bias control circuits 76 are responsive to inputs derived from the respective drivers (73,74,75) for sensing beam current changes induced by the grid pulsing, and develop therefrom respective DC outputs for application to the respective drivers (73,74,75) to suitably control the biases of the respective kinescope cathodes (78R,78B,78G), to which the driver outputs are DC coupled.

For proper operation of the kinescope bias control system, it is important that the signals appearing at terminals R,B and G should be maintained at a reference level throughout each bias control interval. To appreciate how this goal is met, consideration will now be given to the various control system elements which are associated with the signal processing circuits of FIG. 1.

Associated with the luminance amplifier 13 of FIG. 1 is a keyed gain control circuit 55, serving to concomitantly control the gain of luminance amplifier 13 and a chrominance signal amplifier element of chrominance signal processor 20. Illustratively, the gain control circuit 55 is a keyed version of the gain control arrangement described in the copending U.S. patent application Ser. No. 296,865 (now U.S. Pat. No. 4,426,625) of L. A. Harwood, et al.

The gain control circuit 55 receives an adjustable DC control voltage input and a keying wave input, and supplies gain control outputs to amplifier 13 and processor 20. A potentiometer 53, with fixed end terminals respectively connected to the positive (+V) and negative (ground) terminals of a DC voltage supply, is provided with an adjustable tap from which the control voltage input for gain control circuit 55 is derived. Potentiometer 53 serves the function of a viewer-adjustable "picture control" for the color television receiver, permitting viewer adjustment of contrast of the reproduced image via luminance signal gain control, with concomitant chrominance signal gain control assuring that the contrast change is not accompanied by an undesired variation of the saturation of the image colors.

Figure 2:
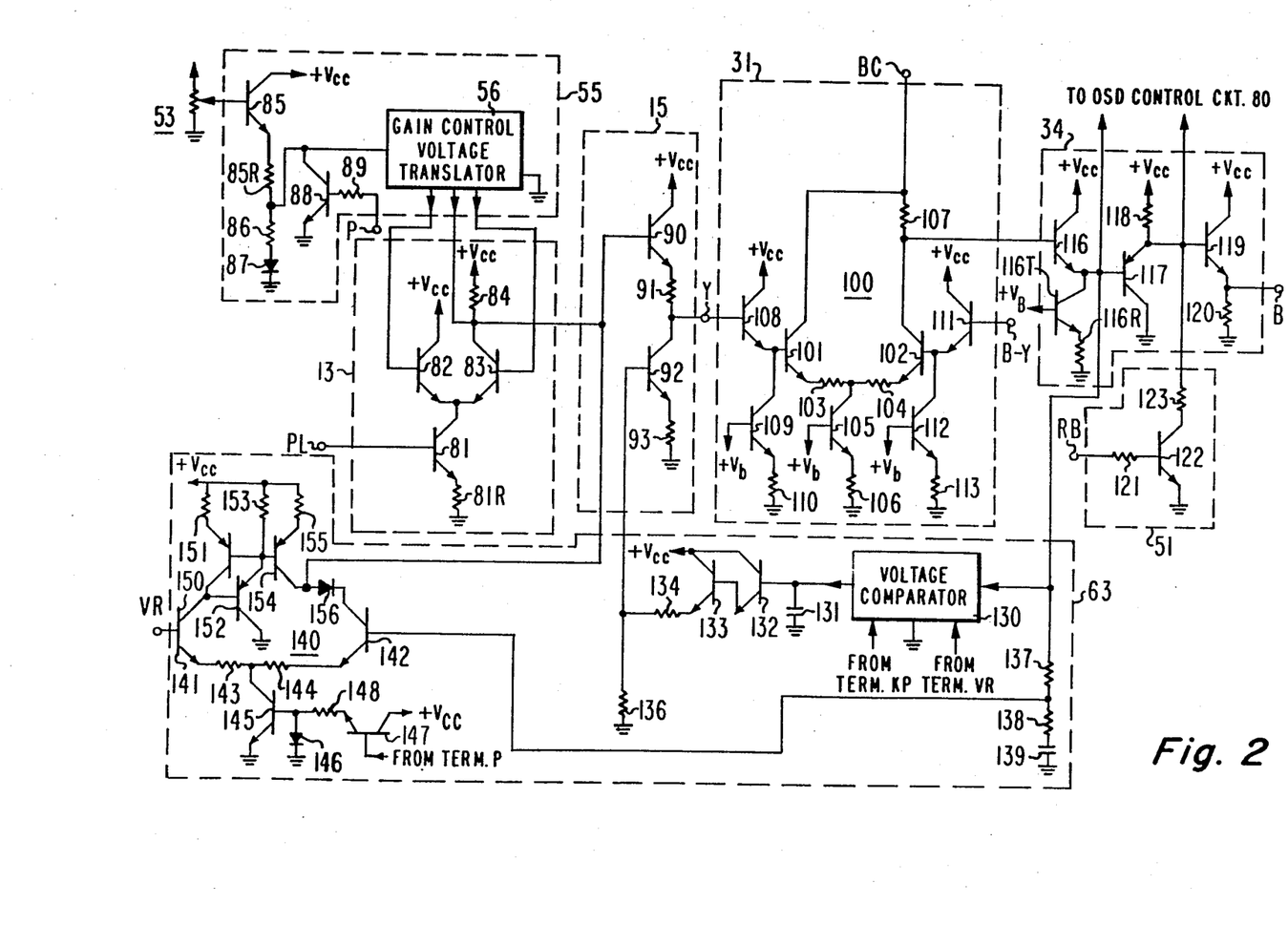
FIG. 2 illustrates, primarily schematically, circuits for implementing functions of selected elements of the FIG. 1 system.
Figure 3:
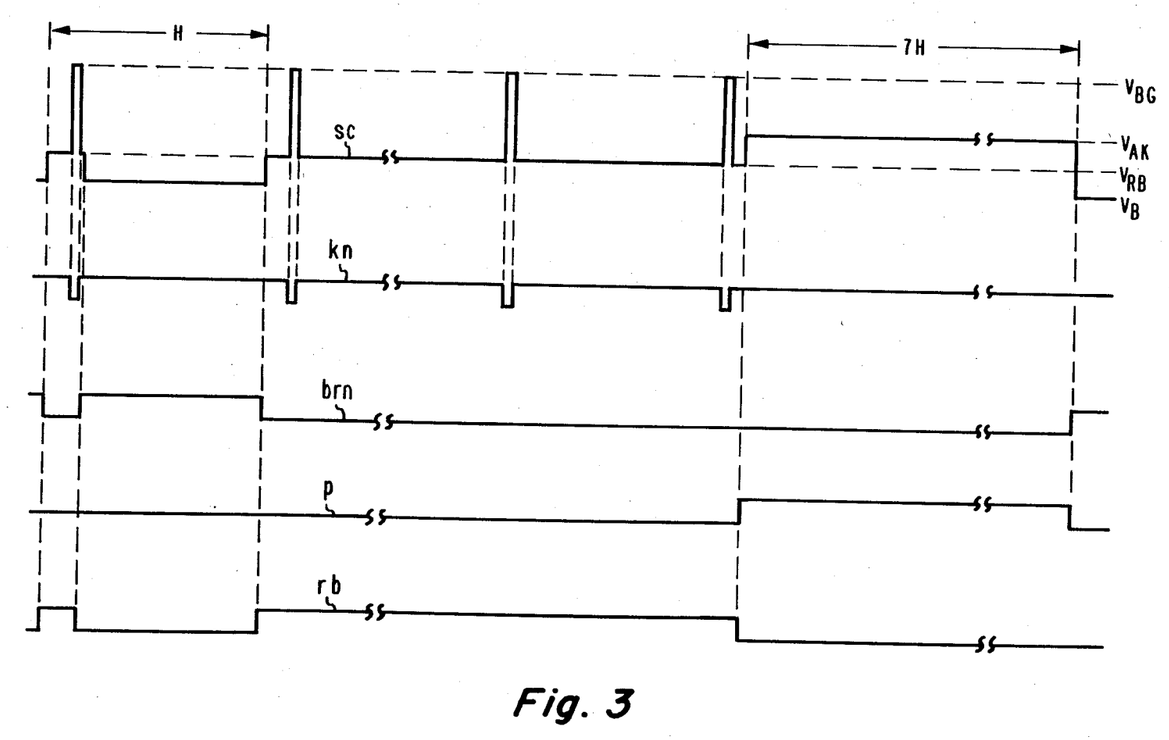
FIG. 3 illustrates graphically waveforms of aid in explaining the operation of FIG. 1 system.

The keying wave input for gain control circuit 55 is derived from terminal P of sandcastle pulse decoder 50, and, as shown by waveform "p" of FIG. 3, comprises a train of positive-going pulses which recur at a field rate, and each of which is timed to coincide with one of the aforementioned bias control intervals (of a 7 line interval duration). Keying wave "p" affects the operation of gain control circuit 55 in such manner that, (a) during each keying pulse appearance, the luminance and chrominance signal gains are rendered independent of the setting of the picture control potentiometer 53, and set instead at a minimum (desirably disabling) level; whereas, (b) during the periods intervening successive keying pulse appearances, the luminance and chrominance signal gains are rendered dependent upon the setting of potentiometer 53. An illustrative apparatus for implementing such keyed operation of gain control circuit 55 will be discussed subsequently in the explanation of the circuitry of FIG. 2.

The source of keying wave "p", sandcastle pulse decoder 50, derives keying wave "p" (and other keying waves previously considered, and to be subsequently considered) from trilevel "sandcastle" pulses, of a general form shown by waveform "sc" of FIG. 3, which are delivered to the decoder's input terminal SC. The sandcastle pulses of waveform "sc" are of a tri-level character, inclusive of composite blanking pulse components at a first level ($V_{RB}$) more positive than the base level ($V_B$), kinescope bias control interval timing pulse components at a second level ($V_{AK}$) more positive than the first level, and burst gating pulse components at a third level ($V_{BG}$) more positive than the second level.

Illustratively, sandcastle pulse decoder 50 comprises circuits of a form described in a copending U.S. patent application of L. A. Harwood, et al., entitled "Tri-level Sandcastle Pulse Decoder" (Application Ser. No. 561,331), and concurrently filed herewith. Illustrative circuits for use in generating the sandcastle wave "sc" are disclosed in a copending U.S. patent application of J. Hettiger, entitled "Tri-level Sandcastle Pulse Encoder" (Application Ser. No. 561,333), also filed concurrently herewith. The sandcastle pulse utilization is of advantage in terminal saving when the various luminance and chrominance signal processing circuits and accompanying control systems shown in FIG. 1 are realized in integrated circuit form on a common, monolithic integrated circuit.

The DC component of the received luminance signal, subject to loss in traversal of coupling capacitor 10, is subject to restoration, in the receiver arrangement illustrated in FIG. 1, by use of a feedback clamp technique in which the output of a keyed voltage comparator 61 is employed to suitably adjust a charge on the input coupling capacitor 10. Comparator 61 develops an output representative of the difference, if any, existing between (1) a signal input derived from luminance amplifier 13, and (2) a reference input derived from a reference voltage terminal VR', during a keying period established by a keying wave derived from terminal KP of sandcastle pulse decoder 50. The keying wave derived from terminal KP corresponds to an inverted version of the keying wave "kn" shown in FIG. 3, and comprises a train of positive-going pulses, recurring at a line rate and timed to coincide with a "back-porch" portion of horizontal blanking intervals of the received signal, but subject to disappearance during the aforementioned kinescope bias control intervals. The sense of the output of comparator 61 is such as to alter the charge on capacitor 10, when necessary, in a direction tending to reduce the difference between the comparator inputs.

As explained more fully in U.S. Pat. No. 4,376,288—Shanley, et al., by suitable selection of the points of derivation for the respective signal and reference inputs to comparator 61, the operation of the described feedback clamp circuit may additionally serve to enhance a DC compensation aspect of a gain control arrangement of the aforementioned Harwood, et al. application type, whereby undesired DC output level variations for the luminance signal output of amplifier 13 do not accompany gain adjustments effected by operation of the picture control.

The control system of FIG. 1 includes an additional trio of keyed voltage comparators 63,65,67, which are employed to stabilize the DC levels of the output color signals appearing at terminals R,B and G, in a manner described in detail in the copending U.S. patent application of R. Shanley, entitled "DC Stabilization System" and concurrently filed herewith.

Comparator 65 develops a DC output potential representative of the difference, if any, existing between (1) a signal input derived from the red signal translator 33, and (2) a reference input derived from a reference voltage terminal VR, during the aforementioned "backporch" keying periods established in response to the keying wave appearing at terminal KP. The output of comparator 65 is supplied as an input to differential amplifier 23, to modify the DC level of the I color-difference signal input to matrix circuits 27 in a direction tending to reduce the difference between the comparator 65 inputs.

Comparator 67 develops a DC output potential representative of the difference, if any, existing between (1) a signal input derived from the green signal translator 35, and (2) a reference input derived from the aforementioned reference voltage terminal VR, during the aforementioned "backporch" keying periods established in response to the keying wave appearing at terminal KP. The output of comparator 67 is supplied as an input to differential amplifier 24, to modify the DC level of the Q color-difference signal input to matrix circuits 27 in a direction tending to reduce the difference between the comparator 67 inputs.

As shown in FIG. 1, the keying of the third voltage comparator (63) of the trio employed for output DC stabilization purposes differs from that of the above-described comparators 65,67, in that comparator 63 is responsive to the keying wave "p" from decoder terminal P, as well as the keying wave appearing at decoder terminal KP. Thus, comparison of inputs takes place in comparator 63 not only during the aforementioned "backporch" keying periods, but also throughout each kinescope bias control interval. The DC output potential of comparator 63 is representative of the difference, if any, existing between (1) a signal input derived from the blue signal translator 34, and (2) a reference input derived from the aforementioned reference voltage terminal VR, during the above-discussed keying intervals, and is supplied as an input to the luminance signal translator 15, to modify the DC level of the luminance signal input to signal combiners 30,31,32 in a direction tending to reduce the difference between the comparator 63 inputs.

The receiver arrangement of FIG. 1 additionally includes a retrace blanking circuit 51, which responds to a keying wave appearing at terminal RB of the sandcastle pulse decoder 50, with a waveform as shown by curve "rb" of FIG. 3. The keying wave "rb" comprises a train of positive-going pulses, inclusive of wide pulse components recurring at a field rate and timed to encompass each period of vertical retrace for the electron beams of color kinescope 77 but terminating upon initiation of said kinescope bias control intervals, and narrower pulse components recurring at a line rate and timed to encompass each period of horizontal beam retrace (outside the vertical retrace period), with the notable exception of those periods of horizontal beam retrace that lie within each of the aforementioned kinescope bias control intervals. Thus, keying wave "rb" is devoid of pulse component appearances during the period of pulse appearance in the previously discussed keying wave "p". Retrace blanking circuit 51 delivers respective outputs to the red, blue and green signal translators 33,34,35, during appearance of the pulse components of keying wave "rb", which drive the respective electron guns of color kinescope 77 beyond cutoff.

The receiver arrangement of FIG. 1 additionally includes a keyed brightness control circuit 71, which is desirably of the general form disclosed in the copending U.S. patent application, Ser. No. 296,863, (now U.S. Pat. No. 4,404,593) of R. Shanley, et al.

The brightness control circuit 71 receives an adjustable DC control voltage input and a pair of keying wave inputs, and develops a DC output potential at terminal BC which is supplied to the respective signal combiners 30,31,32. A potentiometer 70, with fixed end terminals respectively connected to the positive (+V) and negative (ground) terminals of a DC voltage supply, is provided with an adjustable tap from which the control voltage input for brightness control circuit 71 is derived. Potentiometer 70 serves the function of a viewer-adjustable brightness control for the color television receiver, permitting viewer adjustment of the brightness of the reproduced image via concomitant control of the DC levels of the color signal outputs of the signal combiners 30,31,32.

The pair of keying wave inputs for brightness control circuit 71 are derived from terminals BRP and BRN of the sandcastle pulse decoder 50. The keying waves appearing at terminal BRP are inverted versions of the keying waves appearing at terminal BRN, the latter being illustrated by waveform "brn" of FIG. 3 as comprising a train of negative-going pulses. The pulse components of keying wave "brn" include wide, field rate pulse components coinciding in timing with the wide, field rate pulse components of the above-discussed keying wave "rb", and narrower, line rate pulse components coinciding in timing with the narrower, line rate pulse components of keying wave "rb". However, in contrast with the keying wave "rb", which is devoid of pulse appearances during each kinescope bias control interval, the keying wave "brn" also includes additional, relatively wide, pulse components, recurring at a field rate and coinciding with the successive bias control intervals.

The nature of the keyed operation of brightness control circuit 71 is such that (a) during periods intervening the keying pulse component appearances, the level of the DC potential at output terminal BC is dependent upon the setting of the tap on brightness control potentiometer 70, whereas (b) during each keying pulse component apperance, a fixed reference DC level, independent of the brightness control setting, appears at terminal BC.

The receiver arrangement of FIG. 1 also includes a keyed on-screen display control circuit 80, which is illustratively of the form described in the copending U.S. patent application, Ser. No. 352,884, (now U.S. Pat. No. 4,435,729) of L. Harwood, et al. The on-screen display control circuit 80 accepts a trio of auxiliary color signal inputs from terminals "r", "g", and "b", and a pair of keying wave inputs from terminals BRP and BRN of the sandcastle pulse decoder 50. Illustratively, the auxiliary color signals may comprise outputs of a character generator under the control of a suitable character signal source (e.g., apparatus developing a binary coded digital signal representative of the number of the channel to which the receiver is tuned). Within the period selected for display of the auxiliary information, the color signal translators (33,34,35) respond to respective outputs of the display control circuit 80, to the exclusion of the normal outputs of combiners 30,31,32. However, during the appearances of the pulse components of the keying waves from terminals BRP and BRN, the display control circuit 80 is disabled. With such keying waves including pulses encompassing each kinescope bias control interval, disturbance of the cathode current monitoring operation by spurious outputs of the display control circuit 80 is precluded.

In FIG. 2, illustrative circuits for implementing the functions of selected elements of the FIG. 1 system are shown. Circuits contributing to the development of the blue color signal are chosen for illustration purposes, with schematic details shown for the gain controlled luminance amplifier 13, luminance signal translator 15, signal combiner 31, and blue signal translator 34. Circuit details are also shown for several of the control system elements: keyed gain control circuit 55, keyed voltage comparator 63, and the retrace blanking circuit 51.

The gain controlled luminance amplifier 13 includes an NPN transistor 81 disposed as a grounded-emitter amplifier stage, with its base electrode connected to receive signals from terminal PL (the output terminal of the luminance signal processor 11 of FIG. 1), and with its emitter electrode returned to ground via an emitter resistor 81R. The collector electrode of transistor 81 is directly connected to the joined emitter electrodes of a pair of NPN transistors 82,83. The collector electrode of transistor 82 is directly connected to the positive terminal ($+V_{cc}$) of an operating potential supply, while the collector electrode of transistor 83 is connected to the $+V_{cc}$ terminal via a load resistor 84. The base electrodes of transistors 82 and 83 receive respective gain control voltage outputs of the keyed gain control circuit 55.

The keyed gain control circuit 55 includes an NPN transistor 85 disposed as an emitter-follower, with its collector electrode directly connected to the $+V_{cc}$ terminal, with its base electrode connected to the adjustable tap of the (picture control) potentiometer 53, and with its emitter electrode connected via resistors 85R and 86 to the anode of diode 87 (the cathode of which is grounded). The series combination of resistor 86 and diode 87 is shunted by the collector-emitter path of an NPN transistor 88, disposed with its collector electrode directly connected to the emitter electrode of emitter-follower transistor 85, with its emitter electrode grounded, and with its base electrode connected via resistor 89 to terminal P (an output terminal of the sandcastle pulse decoder 50 of FIG. 1).

The voltage appearing across the series combination of resistor 86 and diode 87 is supplied as an input to a gain control voltage translator 56. The translator 56 (not shown in schematic detail) translates the single-ended control voltage input to push-pull outputs for application to the base electrodes of transistors 82,83 of the luminance amplifier 13. Desirably, translator 56 is of the advantageous form described in detail in the previously mentioned copending U.S. patent application, Ser. No. 296,865 (now U.S. Pat. No. 4,426,625) of L. A. Harwood, et al., whereby the difference between the push-pull outputs varies non-linearly with tap adjustment in a manner compensating for non-linearity of the characteristics of amplifier 13. When realized in this advantageous form, translator 56 supplies, as an additional output, a compensating unidirectional current to the load resistor (84) of amplifier 13, serving to substantially preclude an undesired variation of the quiescent DC output potential of amplifier 13 from accompanying a gain control adjustment. To aid this desired result, the voltage developed across resistor 81R desirably constitutes the signal voltage supplied for use as the signal input to comparator 61 of the FIG. 1 system, with a voltage derived from the translator 56 supplied to terminal VR' as the reference input to comparator 61, as explained more fully in the aforementioned U.S. Pat. No. 4,376,288—Shanley, et al.

The luminance signal translator 15 of FIG. 2 comprises a level shift circuit including an NPN transistor 90 disposed as an emitter-follower responding to the output of amplifier 13. The collector electrode of emitter-follower transistor 90 is directly connected to the $+V_{cc}$ terminal, while the base electrode of transistor 90 is directly connected to the collector electrode of the output transistor (83) of amplifier 13. The emitter electrode of transistor 90 is connected to the output terminal Y of translator 15 via a dropping resistor 91. The quiescent DC voltage drop across resistor 91 is controlled by an NPN current source transistor 92 disposed with its collector electrode directly connected to terminal Y, and with its emitter electrode returned to ground via an emitter resistor 93. The current drawn through resistor 91 by transistor 92 is controlled by an output of the keyed voltage comparator apparatus 63 (to be subsequently described in detail) which is applied to the base of transistor 92.

Signal combiner 31, as shown in FIG. 2, includes a differential amplifier 100 incorporating a pair of NPN transistors 101, 102 with emitter electrodes interconnected via the series combination of resistor 103 and resistor 104. A current source for the differential amplifier 100 is formed by an NPN transistor 105, disposed with its collector electrode connected to the junction of resistors 103 and 104, with its emitter electrode returned to ground via emitter resistor 106, and with its base electrode connected to the positive terminal ($+V_b$) of a bias potential supply.

Delivery of luminance signals to one input of the differential amplifier 100 is effected by an emitter-follower formed by transistor 108, disposed with its base electrode directly connected to the output terminal Y of translator 15, with its emitter electrode directly connected to the base electrode of amplifier transistor 101, and with its collector electrode directly connected to the $+V_{cc}$ supply terminal. A current source for the emitter-follower transistor 108 is formed by an NPN transistor 109, disposed with its collector electrode directly connected to the emitter electrode of transistor 108, with its emitter electrode returned to ground via emitter electrode 110, and with its base electrode connected to the $+V_b$ bias supply terminal.

A B—Y color-difference signal is delivered to another input of the differential amplifier 100 by an emitter-follower formed by an NPN transistor 111, disposed with its base electrode directly connected to terminal B—Y (an output terminal of the matrix circuits 27 of the FIG. 1 system), with its emitter electrode directly connected to the base electrode of transistor 102, and with its collector electrode connected to the $+V_{cc}$ supply terminal. A current source for the emitter-follower transistor 111 is formed by an NPN transistor 112, disposed with its collector electrode directly connected to the emitter electrode of transistor 111, with its emitter electrode returned to ground via emitter resistor 113, and with its base electrode connected to the $+V_b$ bias supply terminal.

The collector electrode of amplifier transistor 101 is directly connected to terminal BC (output terminal of the keyed brightness control circuit 71 of the FIG. 1 system), while the collector electrode of amplifier transistor 102 is connected thereto via a load resistor 107. A blue color signal, formed as a combination of the respective luminance and color-difference signal inputs, appears across the load resistor 107. The DC level of the color signal thus formed is affected by the DC potential appearing at terminal BC. Illustratively, with use of a brightness control circuit of the form disclosed in the aforementioned Shanley, et al. patent application (now U.S. Pat. No. 4,404,593), terminal BC is returned to the $+V_{cc}$ supply terminal via the shunted emitter-collector paths of a pair of NPN transistors. During the appearances of the pulse components of keying waves "brp" and "brn", a first one of the shunted transistors is cut off, while the base electrode of the second one of the shunted transistors receives a fixed DC reference voltage. During all other intervals, the second transistor is cut off while the base electrode of the first transistor receives a DC voltage of a magnitude dependent upon the adjustment of the brightness control potentiometer (70, FIG. 1).

The blue signal translator 34 includes, in cascade, a trio of emitter-followers employing, respectively, NPN transistor 116, PNP transistor 117, and NPN transistor 119. Transistor 116 is disposed with its base electrode directly connected to the collector electrode of transistor 102 of signal combiner 31, with its emitter electrode directly connected to the base electrode of emitter-follower transistor 117, and with its collector electrode connected to the $+V_{cc}$ supply terminal. A current source for the emitter-follower transistor 116 is formed by an NPN transistor 116T, disposed with its collector electrode directly connected to the emitter electrode of transistor 116, with its emitter electrode returned to ground via emitter resistor 116R, and with its base electrode connected to the $+V_b$ bias supply terminal. The collector electrode of emitter-follower transistor 117 is grounded, while the emitter electrode thereof is returned to the $+V_{cc}$ supply terminal via resistor 118. Transistor 119 is disposed with its base electrode directly connected to the emitter electrode of emitter-follower transistor 117, with its collector electrode connected to the $+V_{cc}$ supply terminal, and with its emitter electrode directly connected to the blue signal output terminal, and returned to ground via resistor 120.

As shown in FIG. 2, respective connections to the on-screen display control circuit 80 of the FIG. 1 system are provided from the base and emitter electrodes of emitter-follower transistor 117. Illustratively, with use of a display control circuit of the form disclosed in the aformentioned Harwood, et al. U.S. Pat. No. 4,435,729, these connections are such that, during character display intervals, transistor 117 is cut off to decouple the blue color signal output of combiner 31 from the blue signal output terminal B, with a drive from control circuit 80 applied to the base electrode of the output emitter-follower transistor 119 in substitution therefor.

Retrace blanking circuit 51 is shown in FIG. 2 as comprising an NPN transistor 122, disposed with its emitter electrode grounded, with its collector electrode connected to the base electrode of the output emitter-follower transistor 119 via a resistor 123, and with its base electrode connected via resistor 121 to terminal RB (an output terminal of the sandcastle pulse decoder 50 of the FIG. 1 system) so as to receive keying wave "rb". During the appearances of the pulse components of keying wave "rb", transistor 122 is rendered conducting to pull down the potential at the base electrode of the output emitter-follower transistor 119 to a sufficient degree to assure cut-off of the blue electron gun of the image reproducing color kinescope (77, FIG. 1a).

The keyed voltage comparator 63, as shown in FIG. 2, is responsive to the blue color signal appearing at the emitter electrode of transistor 116 of the blue signal translator 34. A first control loop utilizing this signal input comprises a voltage comparator employing a differential amplifier 140. Differential amplifier 140 is formed by a pair of NPN transistors 141, 142 with emitter electrodes interconnected via the series combination of resistors 143 and 144. A current source for differential amplifier 140 is formed by an NPN transistor 145, disposed with its collector electrode connected to the junction of resistors 143 and 144, and with its emitter electrode grounded. The base-emitter path of transistor 145 is shunted by a diode 146, with its anode connected to the base electrode of transistor 145 and with its cathode grounded.

An NPN transistor 147 is disposed as an emitter-follower for supplying the keying wave "p" to the base electrode of the current source transistor 145. The emitter electrode of transistor 147 is connected via a resistor 148 to the base electrode of current source transistor 145, while the collector electrode of transistor 147 is connected to the $+V_{cc}$ supply terminal. The base electrode of the emitter-follower transistor 147 is connected to terminal P (output terminal of the sandcastle pulse decoder 50 of the FIG. 1 system). During the appearances of the pulse components of keying wave "p", current source transistor 145 is rendered conducting to enable the differential amplifier 140, which is disabled during all other intervals.

The differential amplifier 140 is provided with an active load circuit employing a trio of PNP transistors 150, 152, 154, with the collector electrode of amplifier transistor 141 directly connected to the collector electrode of load transistor 150, and with the collector electrode of amplifier transistor 142 linked to the collector electrode of load transistor 154 via a forward-biased diode 156 (disposed with its anode connected to the collector electrode of transistor 154, and with its cathode connected to the collector electrode of transistor 142). The emitter electrodes of load transistors 150 and 154 are returned to the $+V_{cc}$ supply terminal via respective emitter resistors 151 and 155. The remaining PNP transistor 152 is disposed with its collector electrode grounded, with its base electrode directly connected to the joined collector electrodes of transistors 141 and 150, and with its emitter electrode returned via an emitter resistor 153 to the $+V_{cc}$ supply terminal, and directly connected to the base electrodes of the load transistors 150 and 154.

The above-described disposition of transistors 150,152 and 154 forms a current mirror arrangement, whereby the collector current of load transistor 154 mirrors the collector current of amplifier transistor 141. An output lead directly links the collector electrode of load transistor 154 with the base electrode of the emitter-follower transistor 90 of the luminance signal translator 15.

If the potentials at the base electrodes of amplifier transistors 141,142 are balanced during a period of enablement of differential amplifier 140, the collector current demand of transistor 142 is matched in magnitude with the current supplied via the collector electrode of load transistor 154, and the comparator 63 output provides no disturbance of the potential at the base electrode of transistor 90. If, however, an imbalance exists such that the potential at the base electrode of transistor 141 is elevated relative to the potential at the base electrode of transistor 142 during an enablement period, the magnitude of the current supplied via the collector electrode of load transistor 154 exceeds the collector current demand of transistor 142, with the excess supplied via the output lead to result in elevation of the potential at the base electrode of transistor 90. Conversely, if a base potential imbalance of the opposite sense exists during an enablement period, the collector current demand of transistor 142 exceeds the magnitude of current supplied via the collector electrode of load transistor 154, with the consequence that the deficit is supplied from the output lead, resulting in a depression of the potential at the base electrode of transistor 90.

A reference voltage is supplied to one input of the differential amplifier 140 via the direct connection of the base electrode of amplifier transistor 141 to the reference voltage supply terminal VR. A signal voltage is supplied to the other input of the differential amplifier 140 by means of the connection of the base electrode of transistor 142 through series resistor 137 to the emitter electrode of the emitter-follower transistor 116 of the blue signal translator 34. The series combination of a resistor 138 and a capacitor 139 is connected between the base electrode of transistor 142 and ground, and cooperates with series resistor 137 to form a low pass filter. Filter 137-138-139 provides the first control loop with a stability-assuring loop filter, but desirably has a sufficiently wide bandwidth to permit significant loop response at the frequencies within the luminance signal pass band.

As shown by waveform "p", enablement of the first control loop occurs only during each kinescope bias control interval. During the periods intervening such intervals, the first control loop has no effect on the DC level of the luminance signal contribution to the blue signal output. The keyed voltage comparator apparatus 63, however, contains additional components which form a second control loop.

The second control loop includes a voltage comparator 130, accepting a signal input directly from the emitter electrode of the emitter-follower transistor 116 of the blue signal translator 34, and a reference input from the reference voltage supply terminal VR, and also receiving keying waves from terminal KP (an output terminal of the sandcastle pulse decoder 50 of the system of FIG. 1). For the sake of drawing simplification, the schematic details of comparator 130 are not shown in FIG. 2. However, the structure of comparator 130 may desirably correspond with that shown for differential amplifier 140, with the exception of a transposition of inputs such that the reference input is delivered to the counterpart of transistor 142, and the signal input is delivered to the counterpart of transistor 141. The output lead of comparator 130 is connected to one side of a storage capacitor 131, the other side of which is grounded.

During periods of comparator 130 enablement, under conditions of balance between the signal and reference inputs to comparator 130, a positive DC potential of a predetermined intermediate value is developed across storage capacitor 131, and is held during the intervening periods of disablement of comparator 130. If the signal input should rise above the reference input level, a charging current is supplied via the comparator output lead (during enablement periods) to elevate the potential stored across capacitor 131. Conversely, if the signal input should drop below the reference input, a discharging current is drawn via the comparator output lead (during enablement periods) to depress the stored potential.

The stored output of comparator 130 is applied to a pair of cascaded emitter-followers formed by NPN transistors 132 and 133. Transistor 132 is disposed with its base electrode directly connected to the ungrounded side of storage capacitor 131, and its emitter electrode directly connected to the base electrode of transistor 133. The collector electrodes of the emitter-follower transistors 132 and 133 are connected to the $+V_{cc}$ supply terminal. A pair of resistors 134 and 136 are serially-connected between the emitter electrode of transistor 133 and ground. An attenuated version of the stored comparator output, appearing at the junction of resistors 134 and 136, is directly applied to the base electrode of the current source transistor 92 of the luminance signal translator 15. The output of comparator 130 accordingly controls the current drawn by current source transistor 92 through resistor 91, and is thus determinative of the luminance signal level shift introduced by the DC voltage drop across resistor 91.

Circuitry identical to that shown in use for signal combiner 31 in FIG. 2 may advantageously be employed for the respective signal combiners 30 and 32 of the red and green signal channels of the FIG. 1 system, with each subject to control by an output of the keyed brightness control circuit in the manner described previously for signal combiner 31. Likewise, circuitry identical to that shown in use for the blue signal translator 34 in FIG. 2 may advantageously be employed for the red signal translator 33 and the green signal translator 35, respectively, of the FIG. 1 system, with each subject to retrace blanking control and on screen character display control in the manner described previously for the blue signal translator 34.

Each of the respective keyed voltage comparators 65,67 of the FIG. 1 system desirably employs structure similar to that described above for the second control loop (130,131, etc.) of the comparator 63. However, in contrast with the described use of the output of that second control loop in adjusting the DC level of the luminance signal input to the respective signal combiners, the stored output voltage of comparator 65 is supplied to a differential input of amplifier 23 to adjust the DC level of the I color-difference signal inputs to matrix circuits 27, while the stored output voltage of comparator 67 is supplied to a differential input of amplifier 24 to adjust the DC level of the Q color-difference signal inputs to matrix circuits 27.

In operation of the FIG. 1 system, implemented in the manner shown in FIG. 2 and described above, a plurality of safeguards ensure the integrity of the current monitoring and bias adjustment operations undertaken by the AKB control circuits 76 (FIG. 1a) during each kinescope bias control interval. To appreciate the nature of these safeguards, it is appropriate to reconsider the status of each of the keyed control system elements during such control intervals, as summarized below.

Throughout each kinescope bias control interval:

(1) Transistor 88 is keyed on to establish a minimum (desirably zero) value of gain for the luminance signal amplifier 13 (as well as for the chrominance signal amplifier of the chrominance signal processor 20), which gain value is independent of the setting of the picture control potentiometer 53.

(2) The comparator formed by differential amplifier 140 is enabled, closing the first control loop described above for comparator 63, whereas the second control loop's voltage comparator 130, and its counterparts in comparator structures 65 and 67, are disabled.

(3) Signal combiners 30,31,32 receive from the keyed brightness control circuit 71 a fixed reference voltage, of a magnitude independent of the adjustment of the brightness control potentiometer 70.

(4) The blanking transistor 122 for the blue signal channel, and its counterparts for the red and green signal channels, are maintained in a non-conductive state, to preclude driving of the kinescope electron guns beyond cut-off.

(5) The on-screen display control circuit 80 is disabled.

Safeguard (1), above, precludes the picture control adjustment from affecting the operation of the AKB circuits, and provides a first degree of protection against disturbance of the AKB circuit operation by components of the received signals. In the instance of leak-through of luminance signal components (such as VITS signal components) during the kinescope bias control intervals, despite the gain reduction of amplifier 13, a second degree of protection against disturbance of the AKB circuit operation by signal components is obtained via safeguard (2), above, which affords significant degeneration of any leaked-through luminance signal components by virtue of the wideband negative feedback path closed by the enabled amplifier 140. Safeguard (2) also provides enhanced protection against residual effects of DC drift in the luminance signal channel, and precludes any DC shift consequence of the gated gain reduction of amplifier 13 from adversely affecting the AKB circuit operations. Safeguard (3), above, prevents adjustment of the brightness control potentiometer 70 from affecting AKB circuit operations, while safeguard (4), above, protects against undesired cathode current interruptions during the kinescope bias control intervals. Safeguard (5), above, avoids disturbance of the AKB circuit operations by spurious outputs of the OSD control circuit 80.

In one desirable arrangement for utilizing the present invention, means are incorporated for precluding the keying of comparators 63, 65 and 67 during at least a portion of the received signal's vertical sync interval, for error reduction purposes, as explained in a copending U.S. patent application of R. Shanley, et al., entitled "Keyed DC Stabilization System With Protection From Error Introduction During Vertical Sync Interval" and concurrently filed herewith. It is proposed therein, to ensure such keying prevention, that the tri-level sandcastle pulses which are delivered to terminal SC should be freed of at least some of its burst gating pulse components during the vertical sync interval. A desirable technique for achieving such selective elimination of burst gating pulse components is disclosed in a copending U.S. patent application of T. Yost, entitled "Backporch Gating Pulse Generator Subject To Disabling During Vertical Sync Interval" and concurrently filed herewith. When said technique of the aforesaid Yost patent application is employed in sandcastle pulse encoding, the resultant trilevel sandcastle pulse train appearing at terminal SC will conform to a version of the waveform "sc" in which excursions to the $V_{BG}$ level are absent throughout at least a major portion of the vertical sync interval.

What is claimed is:

1. In a color television receiver for displaying color images in response to composite video signals inclusive of respective image-representative luminance and chrominance components, said image-representative components being absent during horizontal blanking portions of successive line intervals within periodic field intervals, and also absent during the vertical blanking portion of each field interval, said receiver including: a color kinescope having a plurality of beam intensity control electrodes for controlling the intensity of a plurality of electron beams tracing a raster of scanning lines upon a viewing screen; means for automatically controlling the bias on the respective control electrodes during periodic bias control intervals encompassing a plurality of successive line intervals within each of said vertical blanking portions; a luminance signal channel for processing said luminance component and including a gain controlled luminance signal amplifier, and a luminance signal translator responsive to an output of said luminance signal amplifier; a chrominance signal channel for processing said chrominance component, and including means responsive to said processed chrominance signal component for developing a plurality of color-difference signal outputs; a signal combiner responsive to one of said color-difference signal outputs and to an output of said luminance signal translator for forming a first color signal; and means for applying said first color signal to one of said kinescope electrodes; control apparatus comprising:

an adjustable gain control voltage source;

keyed gain control means responsive to an output of said gain control voltage source for (1) rendering the gains of said luminance signal amplifier and said chrominance signal processor responsive to said adjustable gain control voltage during all field interval portions with the exception of said bias control intervals; and (2) substantially disabling said luminance signal amplifier and said chrominance signal processor during said bias control intervals;

a control loop for controlling the DC level of said output of said luminance signal translator, said control loop including: keyed comparator means for comparing the voltage attained by said first color signal throughout said bias control intervals with a reference voltage; and means, coupled to said luminance signal translator and responsive to the output of said keyed comparator means, for opposing departures of said attained color signal voltage from substantial equality with said reference voltage;

an adjustable brightness control voltage source; and keyed brightness control means for rendering the DC level of said signal combiner output responsive to said adjustable brightness control voltage during the presence of said image-representative signal components but independent of said adjustable brightness control voltage throughout said bias control intervals.

2. Apparatus in accordance with claim 1, wherein said color-difference signal output developing means includes a pair of color demodulators for recovering first and second color-difference signals from said processed chrominance component and supplying said first and second color-difference signals as inputs to a matrix circuit which forms said plurality of color-difference signal outputs therefrom; and wherein said receiver also includes a second signal combiner, responsive to a second color-difference signal output of said matrix circuit and to said output of said luminance signal translator, for forming a second color signal; a third signal combiner, responsive to a third color-difference signal output output of said matrix circuit and to said output of said luminance signal translator, for forming a third color signal; and respective means for applying said second and third color signals to respective additional ones of said beam intensity control electrodes; said control apparatus also including:

a second control loop for controlling the DC level of said first color-difference signal input to said matrix circuit, said second control loop including second keyed comparator means for comparing said reference voltage with the voltage attained by said second color signal during gating intervals occurring within horizontal blanking portions of line intervals which lie outside of said bias control intervals; and means for modifying said first color-difference signal input to said matrix circuit, in response to the output of said second keyed comparator means, so as to oppose departures of said attained second color signal voltage from substantial equality with said reference voltage; and a third control loop for controlling the DC level of said second color-difference signal input to said matrix circuit, said third control loop including third keyed comparator means for comparing said reference voltage with the voltage attained by said third color signal during said gating intervals; and means for modifying said second color-difference signal input to said matrix circuit, in response to the output of said third keyed comparator means, so as to oppose departures of said attained third color signal voltage from substantial equality with said reference voltage; and wherein said keyed brightness control means additionally renders the DC levels of the color signal outputs of said second and third signal combiners responsive to said adjustable brightness control voltage during the presence of said image-representative signal components but independent of said adjustable brightness control voltage throughout said bias control intervals.

3. Apparatus in accordance with claim 2 wherein said first-named keyed comparator means includes: a voltage comparator, having a first input terminal coupled to receive said reference voltage and a second input terminal coupled to receive said first color signal, said voltage comparator being keyed into operation only during said bias control intervals; said apparatus also including a fourth control loop for controlling the DC level of said luminance signal input to said matrix circuit; said fourth control loop including fourth keyed comparator means for comparing said reference voltage with the voltage attained by said first color signal during said gating intervals; and means for modifying said luminance signal input to said matrix circuit, in response to the output of said fourth keyed comparator means, so as to oppose departures of said attained first color signal voltage from substantial equality with said reference voltage.

4. Apparatus in accordance with claim 3 wherein said keyed brightness control means additionally renders the DC levels of said signal combiner outputs independent of said adjustable brightness control voltage during said gating intervals.

5. Apparatus in accordance with claim 4 also including a retrace blanking circuit for supplying a beam cutoff bias to said electrodes during periods of beam retrace in the tracing of said raster not including beam retrace periods falling within said bias control intervals.

6. Apparatus in accordance with claim 5 also including:

means for developing a first train of pulses recurring at a field rate and timed to substantially coincide with said bias control intervals;

means for developing a second train of pulses recurring at a line rate, but subject to interruption during said bias control intervals, each of the pulses of said second train timed to substantially coincide with a backporch segment of the horizontal blanking portion of a line interval;

means for developing a third train of pulses inclusive of (a) recurring field rate pulses timed to substantially encompass vertical retrace periods for said beams but terminating upon initiation of said bias control intervals, and (b) recurring line rate pulses, subject to interruption during said vertical retrace periods and during said bias control intervals, and timed to substantially encompass horizontal retrace periods for said beams;

means for developing a fourth train of pulses corresponding to the sum of said first and third trains of pulses;

means for supplying said first train of pulses as a keying input to said keyed gain control means, and to said first-named keyed comparator means;

means for supplying said second train of pulses as a keying input to said second, third and fourth keyed comparator means;

means for controlling said retrace blanking circuit with said third train of pulses; and means for supplying said fourth train of pulses as a keying input to said keyed brightness control means.

7. Apparatus in accordance with claim 6 wherein said receiver also includes respective means for supplying auxiliary color signals to respective ones of said beam intensity control electrodes; said control apparatus also including means for disabling said auxiliary color signal supplying means in response to the pulses of said fourth train.

* * * * *